United States Patent [19]
Keyes

[11] 3,934,427
[45] Jan. 27, 1976

[54] DISPENSING MACHINE
[75] Inventor: Richard M. Keyes, Rockford, Ill.
[73] Assignee: Beatrice Foods Co., Chicago,, Ill.
[22] Filed: Sept. 9, 1974
[21] Appl. No.: 504,525

[52] U.S. Cl. .................. 62/342; 222/135; 285/404; 141/258; 251/324
[51] Int. Cl.² .......................................... A23G 9/00
[58] Field of Search ...... 62/342, 390, 125; 222/135, 222/145; 251/324; 285/404; 141/258-262

[56] References Cited
UNITED STATES PATENTS

| | | | |
|---|---|---|---|
| 2,354,925 | 8/1944 | Mills et al. | 222/145 X |
| 2,505,799 | 5/1950 | Smith | 222/135 |
| 2,667,846 | 2/1954 | Grumbly | 137/637.1 |
| 2,934,243 | 4/1960 | Metzger | 222/145 |
| 3,015,420 | 1/1962 | Chudnow | 222/145 X |
| 3,229,476 | 1/1966 | Fraser et al. | 62/342 X |
| 3,741,441 | 6/1973 | Eberle | 222/135 |

FOREIGN PATENTS OR APPLICATIONS

| | | | |
|---|---|---|---|
| 418,070 | 2/1967 | Switzerland | 285/404 |

Primary Examiner—William E. Wayner
Assistant Examiner—William E. Tapolcai, Jr.
Attorney, Agent, or Firm—Morsbach & Pillote

[57] ABSTRACT

The machine dispenses a ready-made milk shake. A freezing chamber has a dispensing valve having porting and a valve element so arranged that flow of the semi-frozen comestible and the flavoring material occurs simultaneously. A beater mixes the two during dispensing. A conduit for the flavoring material has a unique coupling to the valve block and a quick-release coupling intermediate its ends. Upon release of the latter, a manually operable sampling valve may be connected to the conduit to selectively draw a sample of the flavoring. A pump is provided for sucking in a liquid comestible and gas in a preselected proportion and delivering them to the bottom of the freezing chamber. A vent is located in the valve block to vent air from the freezing chamber upon start-up of the machine. The vent has an inlet located at a level so that the liquid and gas volumes in the chamber are about equal to the respective proportions pumped.

13 Claims, 7 Drawing Figures 3,934,427

DISPENSING MACHINE

BACKGROUND

The invention pertains generally to the art of dispensing and more particularly to dispensing a semi-frozen comestible.

Fast food service restaurants frequently install soft ice cream machines or unflavored shake machines. Milk shakes are often made in off-peak times and stored under refrigeration until sold. In practice, flavoring material is placed into a paper cup and the cup is filled with unflavored product. The cup is placed on a mixer from which it is removed, capped, and placed in a freezer. Time studies have shown that this operation takes 35–40 seconds per shake. A faster operation would save employee's time and, if the separate mixer were eliminated, space could be saved. Additionally, if the shakes can be made fast enough, they can be made at the time of sale, thereby providing a more consistent product.

A machine having flavoring dispensed with the ice cream, is shown in U.S. Pat. No. 2,667,846, issued Feb. 2, 1954 to G. P. Grumbly.

SUMMARY

The present invention relates generally to dispensing a semi-frozen comestible.

It is an object of the present invention to provide a machine in which flow of a semi-frozen comestible and a flavoring material occur generally simultaneously.

Another object is to provide a machine in accordance with the above object in which a valve block has a porting arrangement which cooperates with a valve element to provide the simultaneous flow when the valve is opened.

Still another object is to provide the valve element in accordance with the foregoing object with a structure that seals the ports from each other when the valve is closed.

It is another object to provide a machine for dispensing a semi-frozen comestible and a flavoring material, in which the conduit for the flavoring material is readily disconnected from the valve block which has the dispensing valve.

Another object is to provide a machine in accordance with the foregoing object including a quick-release coupling intermediate the ends of the conduit.

Yet another object is to provide a machine in accordance with the foregoing object including a sampling valve connectable to the supply portion of the conduit at the location of the quick-release coupling to selectively sample the flavoring material.

It is another object of the invention to provide a machine for dispensing a semi-forzen comestible in which a liquid comestible and a gas are fed to a freezing compartment in predetermined proportions, and having means to maintain such proportions at start-up of the machine.

Another object is to provide a machine in accordance with the foregoing object in which a vent is provided at a level in the freezing compartment to divide the compartment into a liquid volume and a gas volume having said predetermined proportions.

These, and other objects and advantages of the present invention, will become apparent as the same becomes better understood from the following detailed description when taken in conjunction with the accompanying drawings.

DESCRIPTION

Reference is now made more particularly to the drawings which illustrate the best presently known mode of carrying out the invention and wherein similar reference characters indicate the same parts throughout the several views.

A semi-frozen confection machine 10 includes frame members 12 supporting a housing 14, portions of which are removed for better illustration of the parts. The machine 10 is one which produces a semi-frozen confection which is mixed with a syrup to form a milk shake when drawn from the machine.

A freezer unit 16, a drive motor 18, and a gear box 20 are disposed inside the housing. A valve block 22 is at the front of the machine. These parts are all duplicated, as suggested in FIG. 2, for a reason which will become apparent. The refrigeration system for freezer unit 16 includes compressor 16c driven by motor 16m, and a condensor 16d cooled by fan 16f. As can be seen, this refrigerant system is duplicated for the other freezer unit (not shown). A door D at the front of the machine 10 leads to a refrigerated compartment 24 which holds a liquid confection storage hopper 26. The refrigeration system for compartment 24 includes a compressor 24c and a condensor 24d which is cooled by fan 24f. In the embodiment illustrated, a pump P1, driven by drive motor 23, is provided with an inlet line 25 through which it can suck the liquid confection and pump it through conduit 27 to the freezer unit 16. A second pump P2 is provided for similarly pumping the liquid confection to the second freezer unit (not shown). Identical parts of the duplicated system are indicated by the same reference character on the drawings. The pumps P1 and P2 are advantageously of the type which delivers the liquid confection and air in a preselected proportion. One suitable type is disclosed in U.S. Pat. No. 3,787,154, issued Jan. 22, 1974 to Richard M. Keyes and Bertel S. Nelson. Reference is made to that patent for a more complete description of the pump. It is contemplated that different types of pumps may be used to accomplish this function, and that other arrangements for feeding the confection and air to the freezing unit may be utilized with other features of the invention.

At the rear of the machine is another door R leading to another compartment which stores four tanks T each of which hold a different flavoring syrup or material. A manifold 61 is adapted for connection to a supply of pressurized gas (not shown) and distributes the gas to each tank via a pressure regulator 62 and an air line 63. The syrup is delivered under pressure to the valve block 22 through a syrup conduit including portions 64 and 65. As used herein, the term "flavoring material" is intended to include a flavoring additive and/or a coloring additive.

Figure 3:
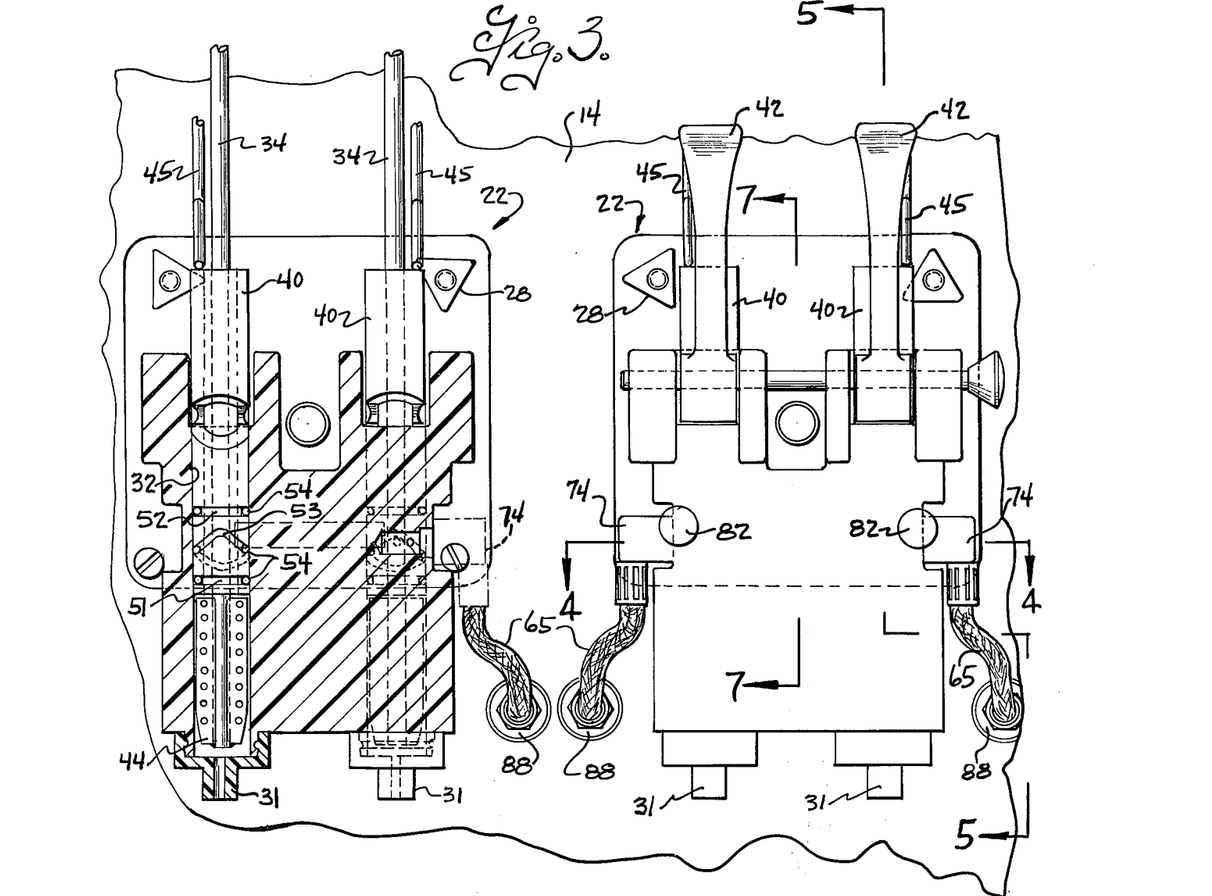
FIG. 3 is a fragmentary view, on a still larger scale, of the two valve blocks, one being shown in elevation and the other being along section line 3—3 of FIG. 4.
Figure 7:
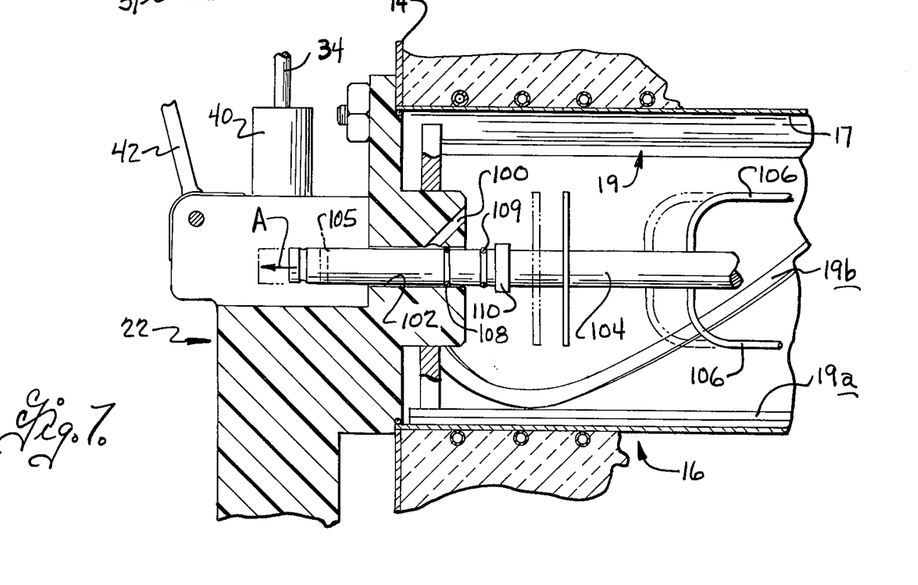
FIG. 7 is a sectional view taken along line 7—7 of FIG. 3.

Each freezing unit 16 may be of any construction well known in the art and, in the embodiment shown, includes a smooth stainless steel cylinder 17 defining a freezing compartment having an outlet end as seen at the left in FIG. 7. A rotary beater 19, driven by motor 18, is provided with a scraper blade 19a and may, but need not be, provided with a helical blade 19b which tends to feed the freezing mass toward the outlet end of the compartment. The valve block 22 is advantageously formed of poly(tetramethylene terephthalate) and is designed to provide a closure for the outlet end. It is held in place by a plurality of fasteners 28 best illustrated in FIG. 3. Each valve block has a pair of outlet nozzles 31 at the bottom of respective elongate chamber 32 which both communicate with a distributor chamber 33 which, in turn, communicates with the freezing compartment. Thus the two elongate chambers each has an inlet port 32a through which soft ice cream is fed from the freezing compartment. Generally opposite inlet port 32a is a second inlet port 32b through which the flavoring syrup is fed to the chamber 32. Ports 32a and 32b are at about the same vertical level in the chamber 32 or, to put it another way, are spaced about an equal distance from the outlet of nozzles 31.

Disposed within each elongate chamber 32 is a drive shaft 34 surrounded by a sleeve 36 of suitable bearing material. Sleeve 36 is surrounded by a valve element 40 which is reciprocably movable by means of lever 42. At the bottom end of drive shaft 34 is affixed a rotary beater 44 which blends the soft ice cream and flavoring material into a milk shake by the time it is dispensed through the outlet nozzle 31. A finger 45 engages the top of the valve element 40 and is arranged to throw a switch 46 (see FIG. 5) when the valve element is raised. The switch 46 controls a drive motor 47 having a driving connection to shaft 34 (see FIG. 2). Thus the beater 44 is driven only when the valve member is raised to an open position.

Valve member 40 contains means operative in the closed position (FIGS. 3 and 5) to block communication between the inlet ports 32a and 32b and to block flow to the dispensing outlet 31. For this purpose, a pair of parallel grooves 51 and 52 are located one below and one above the ports 32a and 32b when the valve element is in the closed position. Grooves 51 and 52 are arranged perpendicular to the axis of valve member 40. A third groove 53 is located intermediate grooves 51 and 52 and is canted or inclined relative to them. Each groove has a sealing ring in the form of an O-ring 54 disposed therein for sealing against the inside of the elongate chamber 32. Preferably, the intermediate groove 53 is shallower than grooves 51 and 52, and the O-rings are of identical size and made of elastomeric material. Obviously the circumference of groove 53 is longer than the others; however, the shallower depth compensates so that identical sized O-rings 54 can be used in all three grooves and are thus interchangeable. The arrangement of the third or intermediate groove 53 is such that, in the closed position, it is below one of the inlet ports and above the other. In this manner, the ports are sealed from each other when the valve member 40 is in closed position. In the open position of the valve member 40 indicated in phantom lines in FIG. 5, all the grooves are disposed above both inlet ports 32a and 32b. With the ports 32a and 32b being at the same level, and groove 51 being horizontal, flow of the semi-frozen comestible and the flavoring material occurs simultaneously when the valve member is in that open position. Conversely, the flow is stopped when the valve member is closed. With this valving arrangement, no additional shut-off valves are required to control the flow of the flavoring material.

Figure 4:
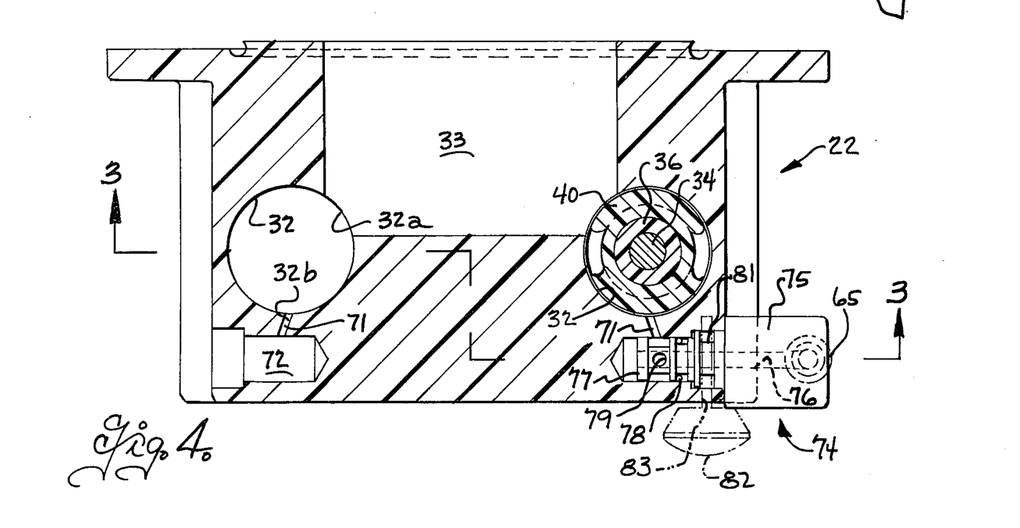
FIG. 4 is a horizontal section through the valve block taken along line 4—4 of FIG. 3.

As best shown in FIG. 4, second inlet port 32b for the syrup communicates with a passageway 71 which leads to a stepped chamber 72. On the end of conduit 65 and fitted into chamber 72 is a coupling, generally designated 74. Coupling 74 is advantageously in the shape of an elbow (see FIG. 3) and has an external portion 75 larger than the stepped chamber 72 to engage the side of valve block 22. Another portion of the coupling is disposed within the stepped chamber 72, as best seen in FIG. 4. The coupling 74 has a passageway 76 which leads from the conduit 65 to a terminus end 77 located in the chamber 72 at a point inwardly of passageway 71. Outwardly of passageway 71 is an O-ring 78 which seals against the internal wall of chamber 72 to prevent leakage of syrup therepast. Between the terminus 77 and O-ring 78 is a lateral opening 79 which intersects passageway 76 and provides an outlet closely adjacent the passageway 71. An enlarged portion of the coupling 74 is disposed in the larger portion of stepped chamber 72 and has a circumferential groove 81 therein. A headed pin 82 fitted in a drill hole 83 passes through the groove 81 to retain the coupling 74 in position on the valve block 22. Upon withdrawal of pin 82, coupling 74 can be easily removed from the valve block 22 for cleaning purposes, for example.

Figures 5, 6:
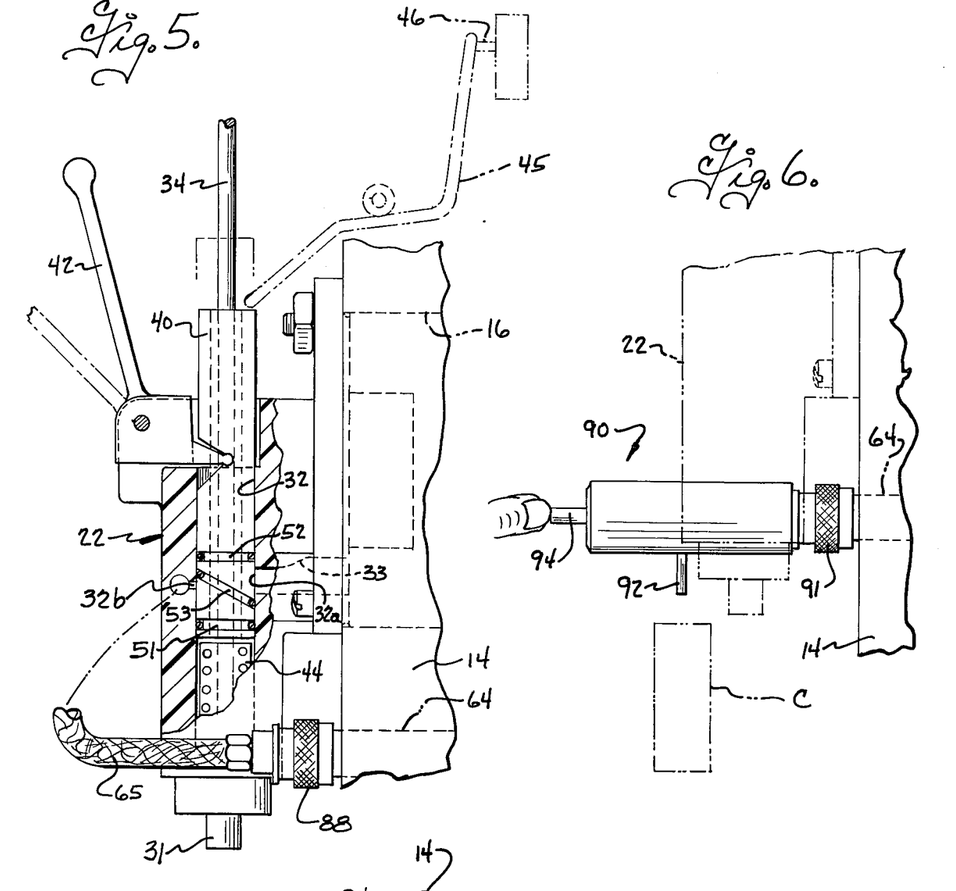
FIG. 5 is a partial section taken generally along line 5—5 of FIG. 3.
FIG. 6 is a view showing the sampling valve connected to the conduit.

As seen in FIG. 5, the connection between conduit portions 64 and 65 is adjacent the front of the machine at the surface of the housing 14. The connection is made by a quick disconnect coupling 88 of the double end shut-off type. As is conventional, such double end shut-off type quick disconnect couplings incorporate a check valve in both portions of the coupling which close when the coupling portions are uncoupled. This allows the two portions to be disconnected without releasing the pressure in tank T. To clean conduit portion 65 and/or the valve block 22, the disconnect coupling 88 is first released, pin 82 is withdrawn from the valve block 22, and then coupling 74 is removed.

The quick disconnect coupling 88 serves another important function. As shown in FIG. 6, manually operable valve 90, having a mating coupling portion 91 can be attached to conduit 64 after conduit 65 is removed. The coupling portion 91 of the valve 90 incorporates means to open the check valve in the supply portion of the coupling when connected thereto. The valve 90 has an outlet spigot 92 and a button 94 to allow flow from the spigot when depressed. This permits a sample of the syrup to be easily taken.

The sampling valve 90 is used to calibrate the syrup fed into the valve block 22. The procedure for doing this is to first check the time it takes to draw a shake of the desired weight. After the draw time has been determined by a stopwatch, the sampling valve 90 is installed, and a calibrated cup indicated diagrammatically at C in FIG. 6 is held under the spigot 92. The button 94 is depressed for twice the amount of time it takes to draw a shake. Ideally, two ounces of syrup will be drawn in this time period or, in other words, one ounce of syrup will be fed to each eleven ounce shake. The pressure regulator 62 can be adjusted to achieve proper syrup flow if it is not correct.

The amount of syrup in the finished shake is important and accomplished as described above. Additionally, the percentage of air entrained in the milk shake is also important. As previously described, a percentage of air is drawn into pump P and delivered to the freezing chamber 16. At start-up, however, the freezing chamber is already filled with air and the present embodiment provides apparatus to assure that the proper ratio is obtained at that time. An exemplary amount of air is 75% of the amount of liquid confection and the pump may be arranged to deliver such a proportion to the freezing compartment 17.

In FIG. 7 there is shown a channel 100 which has an inlet at a level dividing the volume of the freezing compartment 17 into a liquid volume below the inlet, and a gas volume above the inlet. These two volumes have a ratio equal to the ratio of air to liquid delivered by the pump. The channel 100 has an outlet at a level below its inlet and, in the present embodiment, the outlet terminates at a bore 102. Bore 102 is advantageously located axially of the freezing compartment 17 and the terminus of channel 100 is inwardly of the outer surface of valve block 22. Passing through the bore 102 is a central shaft 104, on which are fixed a plurality of arms 106. The shaft 104 and arms 106 operate to sense the viscosity of the material as it is frozen and, by means of a finger extending through a transverse bore 105, provide a control for a switch (not shown) which shuts off the motor 16m and thereby shuts down the refrigeration to the freezing unit 16. The manner in which this is accomplished is described in greater detail in U.S. Pat. No. 3,298,190 issued Jan. 17, 1967 to Charles B. Harker and owned by the assignee of the present invention. Reference is made to that patent for a more detailed description.

Figure 1:
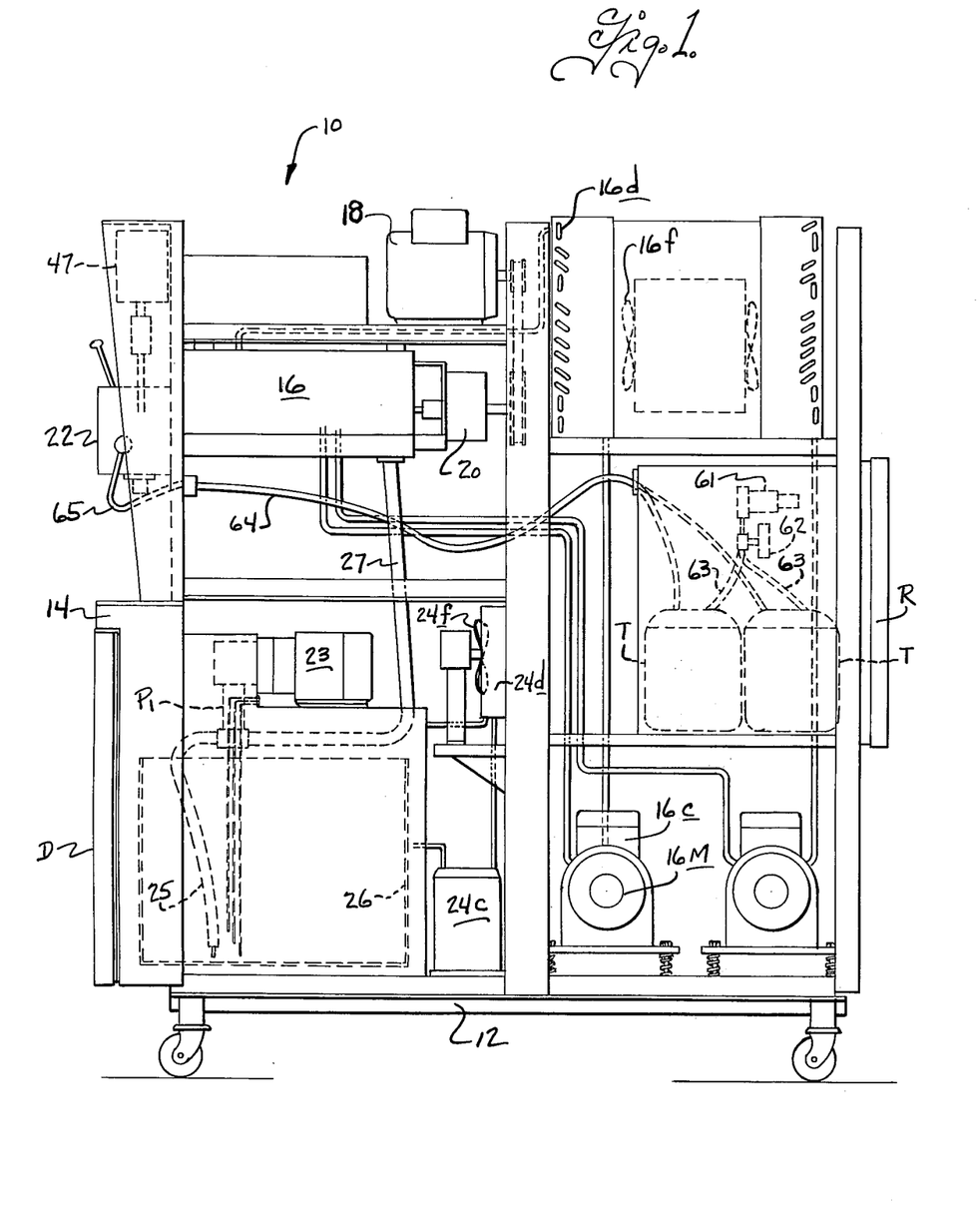
FIG. 1 is a side elevation of a machine constructed in accordance with the present invention, and having portions of the housing removed for better illustration of the parts.

In the present embodiment, the shaft 104 is movable longitudinally as indicated by arrow A in FIG. 7. It is intended that such movement can be easily accomplished manually. Two O-rings 108 and 109 are disposed in grooves in the shaft 104 outwardly of a collar 110 which provides a stop when the shaft is at the outermost position. Upon start-up, the shaft is pushed inwardly to the position shown in solid lines in FIG. 7. At this position, the outermost O-ring 108 seals against bore 102 inwardly of the outlet of channel 100. With the pump P operating, liquid confection and air is pumped into the freezing chamber 116 and the excess air is vented through channel 100. Since the air will separate from the liquid as it enters the freezing chamber, air will continue to be vented until the liquid level is at the inlet end of channel 100. Since this is positioned to divide the compartment into the desired percentages, the operator will know when this is accomplished when liquid starts flowing out around shaft 104. The operator can then shut off the pump and pull shaft 104 to its outermost position. At this position, O-ring 108 seals outwardly of the channel 100 and O-ring 109 seals inwardly thereof. In this manner, there is provided consistency in the percentage of gas in the aerated semi-frozen ice cream being made in the freezing chamber both during start-up and subsequently thereto. Such a venting arrangement is particularly advantageous when the liquid comestible is fed to the freezing chamber at the bottom, as illustrated in FIG. 1. In other words, the supply conduit 27 is operatively connected to the freezing chamber at a level below the venting inlet 100.

Figure 2:
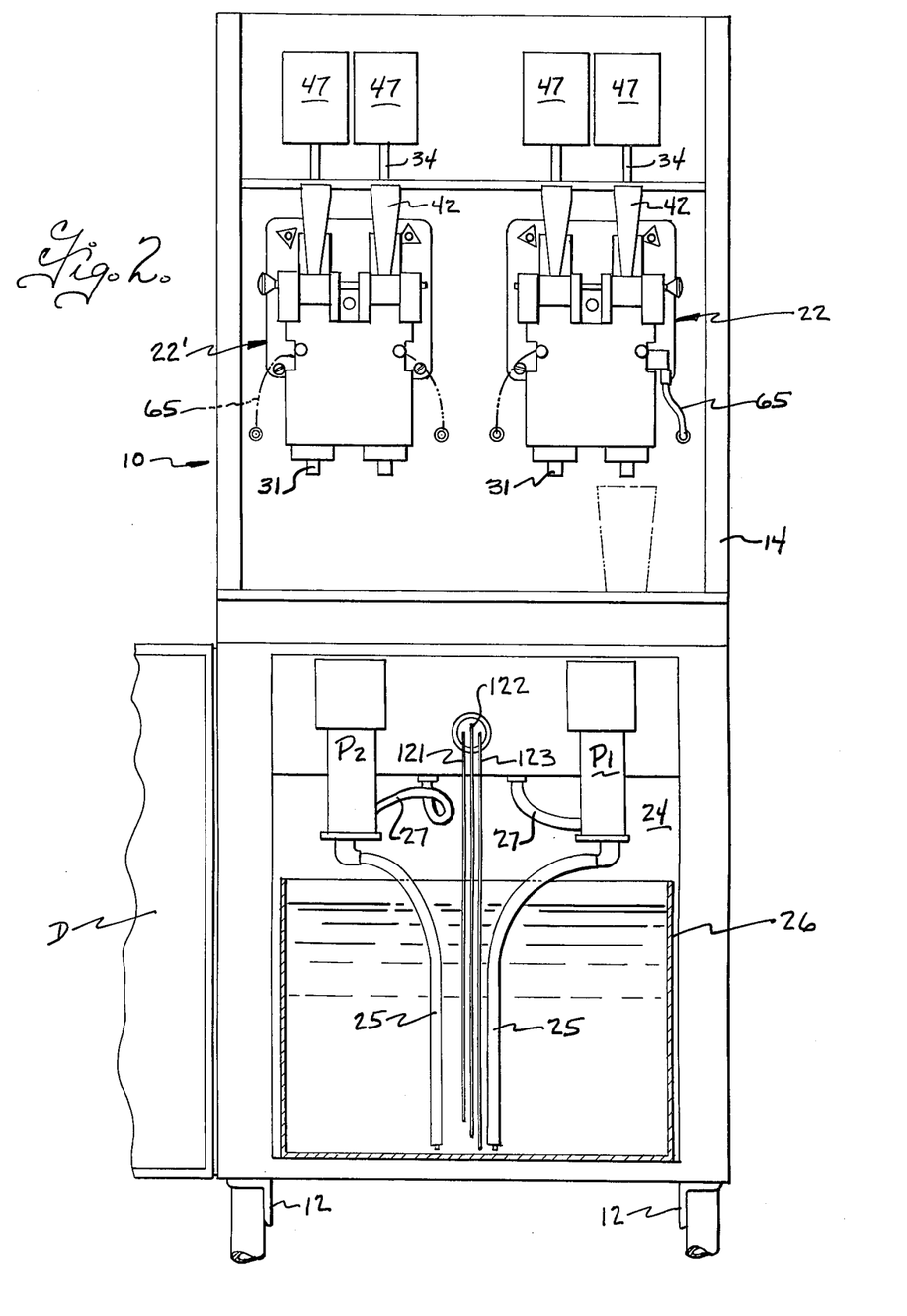
FIG. 2 is a front elevation as seen from the left of FIG. 1 but on a slightly larger scale, and also having portions of the housing removed and the door opened for better illustration.

In order to provide the desired consistency, it is necessary that the pumps P1 and P2 be provided with an adequate supply of liquid comestible in storage hopper 26. To assure this, a plurality of electrical probes 121–123 are provided, as best seen in FIG. 2. As can be seen, these probes depend to three different levels adjacent the bottom of storage hopper 26. The lowermost probe 123 is a common line; the shortest probe 121 is operatively wired to control a warning light (not shown) which is switched on when the liquid level falls below probe 121. Probe 122, of intermediate length, is wired to controls for which are arranged to interrupt the functional operation of the machine when the liquid level falls below probe 122. In this manner, a warning light tells the operator when additional liquid comestible should be added to the storage hopper 16 and, if it is not added in time, the operation is shut down. By shutting down the machine, one is assured that it is operative only when the proper proportions of liquid comestible and air are fed to the freezing chamber 16. This assures the quality of the milk shakes being dispensed and eliminates maintenance problems.

While a preferred embodiment of the invention has herein been illustrated and described, this has been done by way of illustration and not limitation, and the invention should not be limited except as required by the scope of the appended claims.

The embodiments of the invention in which an exclusive property or privilege is claimed are defined as follows:

1. In a machine for dispensing an aerated semifrozen comestible including a freezing compartment having an outlet; refrigeration means for refrigerating the surface of the freezing compartment; a reservoir for holding a liquid comestible; supply means for supplying the liquid comestible and a gas to the freezing compartment; and means in the freezing compartment for scraping the frozen comestible off the surface thereof, and for entraining the gas in the comestible; the improvement comprising:

a valve block at the freezing compartment outlet and having an elongate chamber therein; said chamber having a dispensing outlet, and first and second inlet ports at opposite sides of the chamber and spaced about an equal distance from the dispensing outlet so that the inlet ports are about the same level in the chamber; a first passageway connecting one inlet port to the freezing compartment; a supply of flavoring material; a second passageway connecting the other inlet port to said supply; feed means for feeding the flavoring material under pressure through the second passageway to said other inlet port; a valve member mounted in the chamber and reciprocably movable between an open position and a closed position; and means on the valve member operative in the closed position to prevent communication between the inlet ports and to block flow to the dispensing outlet, whereby flow of the aerated semi-frozen comestible and flavoring material occurs simultaneously when the valve member is in open position, and is stopped when the valve member is closed.

2. A machine as set forth in claim 1 including a pair of spaced grooves on the valve member located one below and one above the inlet ports when the valve member is in closed position; a third groove on the valve member intermediate said pair and canted so that it is below one of the inlet ports and above the other when the valve member is in its closed position; and a sealing ring disposed in each groove; whereby the intermediate sealing ring seals the inlet ports from each other when the valve member is in closed position.

3. A machine as set forth in claim 2 wherein the valve block is formed of thermoplastic resin of a type having characteristics similar to poly(tetramethylene terephthalate).

4. A machine as set forth in claim 2 wherein the elongate chamber has a generally uniform diameter, the pair of grooves are in planes perpendicular to the axis of the elongate chamber, the intermediate groove is longer than the others, and the sealing rings are O-rings of identical size and of elastomeric material to fit into the grooves; whereby the O-rings are interchangeable.

5. A machine as set forth in claim 1 wherein the second passageway includes conduit means leading from said supply of flavoring material to the valve block; a passageway in the valve block from said other inlet port to the exterior of the valve block; and having an enlargement adjacent said exterior; a connecting member on the conduit means and sized to fit into the passageway enlargement; the connecting member having a shoulder facing the upstream end thereof; and a releasable fastener in the valve block for engagement with the shoulder to releasably hold the connecting member in position.

6. A machine as set forth in claim 5 including a quick-release coupling intermediate the ends of the conduit dividing the conduit into a supply portion and a valve block portion, whereby the valve block portion can be disconnected from both the supply portion and the valve block; a manually operable sampling valve having means for connecting to the supply portion of the conduit and operable for selectively drawing a sample of flavoring material therefrom; and means for adjusting the feed means to vary the amount of flavoring material dispensed per unit of time.

7. A machine as set forth in claim 6 wherein: the supply means includes a pump which sucks in the liquid comestible and gas simultaneously; an electric motor for driving the pump, and a supply line having one end operatively connected to the pump and another end operatively connected to the freezing compartment; the quick-release coupling incorporates a check valve in both the supply portion and the valve block portion of the conduit to close the conduit when the portions are uncoupled; and the manually operable sampling valve incorporates means to open the check valve in the supply portion of the conduit when connected thereto; and including: three electrical probes in the liquid reservoir and depending to three different levels adjacent the bottom of the reservoir, the lowermost probe being a common line, the uppermost probe being operative to control a warning light when the liquid level falls below the uppermost probe, and the intermediate probe being operative to control the pump motor and arranged to interrupt current thereto when the liquid level falls below the intermediate probe; and a rotary beater positioned in the valve chamber between the valve member and dispensing outlet to blend the semi-frozen comestible and flavoring material before they are dispensed.

8. In a semi-frozen confection machine including a freezing compartment having an outlet at its front end and adapted to freeze a liquid comestible; a reservoir communicating with the freezing compartment and adapted to hold and supply the liquid comestible to the freezing compartment; and a rotary beater in the freezing compartment to rotatably stir the comestible therein; and improvement comprising:

a valve block having a back side adjacent the freezing compartment outlet and having a valve chamber therein; said chamber having a dispensing outlet and first and second inlet ports; a first passageway connecting one inlet port to the freezing compartment; a second passageway leading from the other inlet port to the exterior of the valve block at one side thereof; a supply of flavoring material; a conduit connected to said supply and having an end at said one side of the valve block; a coupling on the end of the conduit and having a portion received in the second passageway; seal means on the coupling for sealing against the passageway; the valve block having a bore extending transverse of the passageway at a location between the seal means and the one side of the block; and a manually-removable fastener extending through the bore and engaged with the coupling to hold it in the passageway, means for feeding the flavoring material under pressure through the conduit to the valve chamber; a quick-release coupling intermediate the ends of conduit dividing the conduit into a supply portion and a valve block portion, whereby the valve block portion can be disconnected from both the supply portion and the valve block; and a manually operable sampling valve having means for connecting to the supply portion of the conduit and operable for selectively drawing a sample of flavoring material therefrom.

9. In a semi-frozen confection machine including a freezing compartment having an outlet at its front end and adapted to freeze a liquid comestible; a reservoir communicating with the freezing compartment and adapted to hold and supply the liquid comestible to the freezing compartment; and a rotary beater in the freezing compartment to rotatably stir the comestible therein; and improvement comprising:

a valve block having a back side adjacent the freezing compartment outlet and having a valve chamber therein; said chamber having a dispensing outlet and first and second inlet ports; a first passageway connecting one inlet port to the freezing compartment; a second passageway leading from the other inlet port to the exterior of the valve block at one side thereof; a supply of flavoring material; a conduit connected to said supply and having an end at said one side of the valve block; a coupling on the end of the conduit and having a portion received in the second passageway; seal means on the coupling for sealing against the passageway; the valve block having a bore extending transverse of the passageway at a location between the seal means and the one side of the block; and a manually-removable fastener extending through the bore and engaged with the coupling to hold it in the passageway, a valve member mounted in the valve chamber and reciprocably movable between an open position and a closed position blocking flow through the inlet ports; a pair of spaced parallel grooves on the valve member located one below and one above the inlet ports when the valve member is in the closed position; a third groove on the valve member intermediate said pair and shaped so that it is below one of the inlet ports and above the other; and a sealing ring disposed in each groove and sealing against the valve chamber; whereby the intermediate sealing ring seals the inlet ports from each other when the valve member is in closed position.

10. In a machine for dispensing a semi-frozen comestible and a flavoring material including a freezing compartment; refrigeration means for refrigerating a surface of the freezing compartment; a first reservoir for holding a liquid comestible; a first supply means for supplying the liquid comestible and a gas to the freezing compartment; means in the freezing compartment for mixing the frozen comestible and the gas therein; and a second reservoir for a flavoring material, the improvement comprising:

a valve block at the freezing compartment and having at least one generally upright elongate chamber therein; said chamber having a dispensing outlet at its lower end; and first and second inlet ports at opposite sides of the chamber and spaced about an equal distance above the dispensing outlet so that the inlet ports are about the same level in the chamber; a first passageway connecting one inlet port to the freezing compartment; a second passageway connecting the other inlet port to said second reservoir means; feed means for feeding the flavoring material under pressure through the second passageway to said other inlet port; an elongate valve member mounted in the chamber and reciprocably movable between an open position and a closed position; said valve member having upper and lower spaced sealing rings extending therearound in planes crosswise of the valve member respectively above and below said inlet ports when the valve member is in its closed position and an intermediate sealing ring extending around the valve member intermediate the upper and lower sealing rings and canted relative to the valve member so that it is below one of the inlet ports and above the other inlet port when the valve member is in its closed position to seal the inlet ports from each other, said upper, lower and intermediate sealing rings being disposed above said inlet ports when the valve member is moved to its open position whereby flow of semi-frozen comestible and flavoring material occurs simultaneously when the valve member is in open position and is stopped when the valve member is in its closed position.

11. A machine as set forth in claim 10 wherein said second passageway includes a conduit leading from the second reservoir means for flavoring material to the valve block, a quick-release coupling intermediate the ends of the conduit dividing the conduit into a supply portion connected to the second reservoir means and a valve block portion connected to the valve block, whereby the valve block portion can be disconnected from the supply portion; a manually operable sampling valve having means adapted for connection to the supply portion of the conduit and operable for selectively drawing a sample of flavoring material therefrom; and means for adjusting the feed means to vary the amount of flavoring material dispensed per unit of time.

12. A machine as set forth in claim 11 wherein: the quick-release coupling incorporates a check valve in both the supply portion and the valve block portion of the conduit to close the conduit when the portions are uncoupled and the sampling valve incorporates means to open the check valve in the supply portion of the conduit when connected thereto.

13. A machine according to claim 12 including means in the lower portion of said generally upright elongate chamber for mixing said semi-frozen comestible and said flavoring material when the valve member is open.

* * * * *

UNITED STATES PATENT OFFICE
CERTIFICATE OF CORRECTION

PATENT NO. : 3,934,427
DATED : January 27, 1976
INVENTOR(S) : Richard M. Keyes

It is certified that error appears in the above-identified patent and that said Letters Patent are hereby corrected as shown below:

Column 10, line 37, "12" should be -- 10 --.

Signed and Sealed this twenty-seventh Day of April 1976

[SEAL]

Attest:

RUTH C. MASON
Attesting Officer

C. MARSHALL DANN
Commissioner of Patents and Trademarks